W. H. BURT.
SPIROMETER.
No. 180,842.          Patented Aug. 8, 1876.
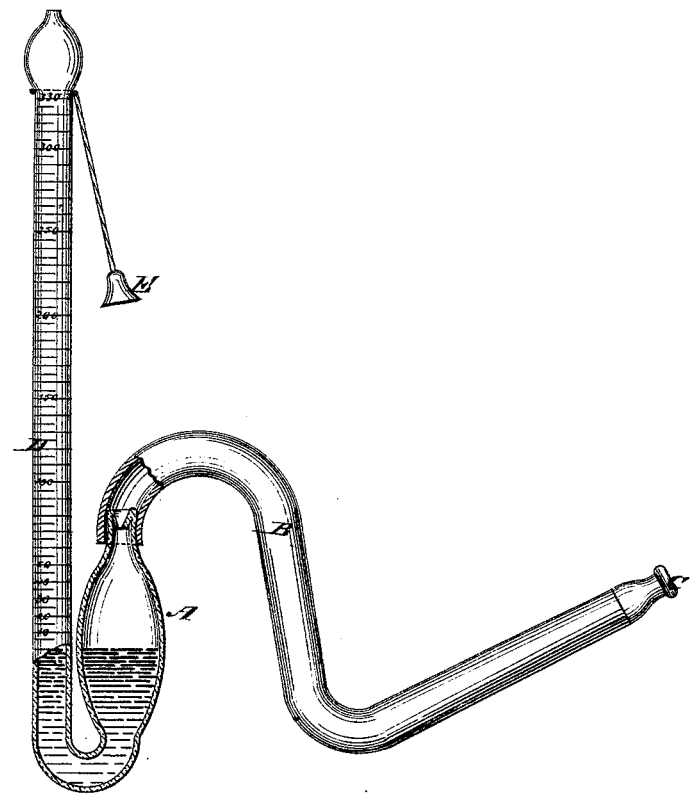
WITNESSES:
Francis McArdle.
John Goethals
INVENTOR:
W. H. Burt
BY
ATTORNEYS.

UNITED STATES PATENT OFFICE.

WILLIAM H. BURT, OF CHICAGO, ILLINOIS.

IMPROVEMENT IN SPIROMETERS.

Specification forming part of Letters Patent No. 180,842, dated August 8, 1876; application filed January 29, 1876.

*To all whom it may concern:*

Be it known that I, WILLIAM H. BURT, of Chicago, Cook county, Illinois, have invented a new and Improved Spirometer, of which the following is a specification:

My invention is designed to produce a pocket spirometer, by which the breathing-capacity of a person's lungs can readily be measured in cubic inches, by mercury, oil, glycerine, spirits, water, or all other liquid substances. It consists of a simple glass tube with a small bulb at the base filled with mercury or other liquid, upon which bulb is a rubber tube with a mouth-piece; also, a vertical scaled tube, into which the mercury or other liquid is blown for testing the lungs in cubic inches.

The drawing is partly a side elevation and partly a sectional elevation of my improved spirometer.

A is the glass bulb, for containing the mercury or other liquid substance. B is the rubber tube, with a mouth-piece, C, and D is the scaled tube for measuring the height of the column raised by the lungs. The rubber tube connects with a nozzle on the top of the bulb, and the glass tube connects with the bottom of the bulb by a return bend. The top of the vertical tube is open to the atmosphere, to prevent compressing the air above the liquid, and a little cap, E, may be used for closing it, to exclude dust, &c., and preventing the liquid from running out by pneumatic pressure. This cap must be taken off when in use. Or, the top of the scaled tube and mouth-piece may have a funnel-shaped glass blown into the top of each, which will prevent the liquid from running out, and the cap can be dispensed with; or a cork may be put into the nozzle, and also in the tube, to retain the liquid, in which case both the cap and funnel-shaped glass will not be required. When in use, this cork must be removed, or the instrument will not work.

Having thus described my invention, I claim as new and desire to secure by Letters Patent—

The improved spirometer, consisting of a bulb, A, flexible tube B, mouth-piece C, and the scaled tube D, combined and arranged substantially as specified.

WILLIAM H. BURT.

Witnesses:
HARVEY W. D. BREWSTER,
ALBERT F. WILLCOX.